(12) United States Patent  (10) Patent No.: US 6,485,157 B2
Ohkawa  (45) Date of Patent: Nov. 26, 2002

(54) LIGHT GUIDE PLATE, SURFACE LIGHT SOURCE DEVICE AND LIQUID CRYSTAL DISPLAY

(75) Inventor: Shingo Ohkawa, Koshigaya (JP)

(73) Assignee: Enplas Corporation, Kawaguchi (JP)

( * ) Notice: Subject to any disclaimer, the term of this patent is extended or adjusted under 35 U.S.C. 154(b) by 0 days.

(21) Appl. No.: 09/816,122

(22) Filed: Mar. 26, 2001

(65) Prior Publication Data

US 2002/0044233 A1 Apr. 18, 2002

(30) Foreign Application Priority Data

Mar. 31, 2000 (JP) ........................................ 2000-097651

(51) Int. Cl.⁷ ................................................ F21V 7/04
(52) U.S. Cl. .................... 362/31; 362/333; 362/346; 362/26; 349/65; 359/599; 385/901
(58) Field of Search ........................ 362/31, 331, 333, 362/348, 346, 26; 349/64, 65; 359/599; 385/901

(56) References Cited

U.S. PATENT DOCUMENTS 5,136,480 A * 8/1992 Pristash et al. ................ 362/31
5,339,179 A * 8/1994 Rudisill ........................ 359/49
5,467,417 A * 11/1995 Nakamura et al. ............ 385/36
5,649,754 A * 7/1997 Matsumoto .................. 362/31

FOREIGN PATENT DOCUMENTS

EP  1072907  1/2001

* cited by examiner

Primary Examiner—Sandra O'Shea
Assistant Examiner—Ali Alavi
(74) Attorney, Agent, or Firm—Staas & Halsey LLP

(57) ABSTRACT

A surface light source device and LCD employs a light guide plate which is capable of a three-dimensional emission direction controlling and avoids fine unevenness in brightness from appearing. Light guide plate 34 has a back face 34 provided with a great number of micro-reflectors 90 each of which has a guiding portion and a conversion output portion including a valley getting narrower and shallower as being distant from the guiding portion. The conversion output portion reflects input light P twice at inner slopes to produce inner output light Q. Inner output light Q is inner-incident to a slope of projection raw PR. While some of the inner incident light becomes directly escaping light, some other of the inner incident light fails to escape directly, reaching emission face 33 after travelling further along various light paths. Indirectly escaping light is emitted at second or later chances of emission. Directly escaping light and indirectly escaping light overlap, thereby preventing fine unevenness in brightness from appearing. It is advantageous to dispose reflector RF for increasing indirectly escaping light.

15 Claims, 12 Drawing Sheets

(Prior Art)

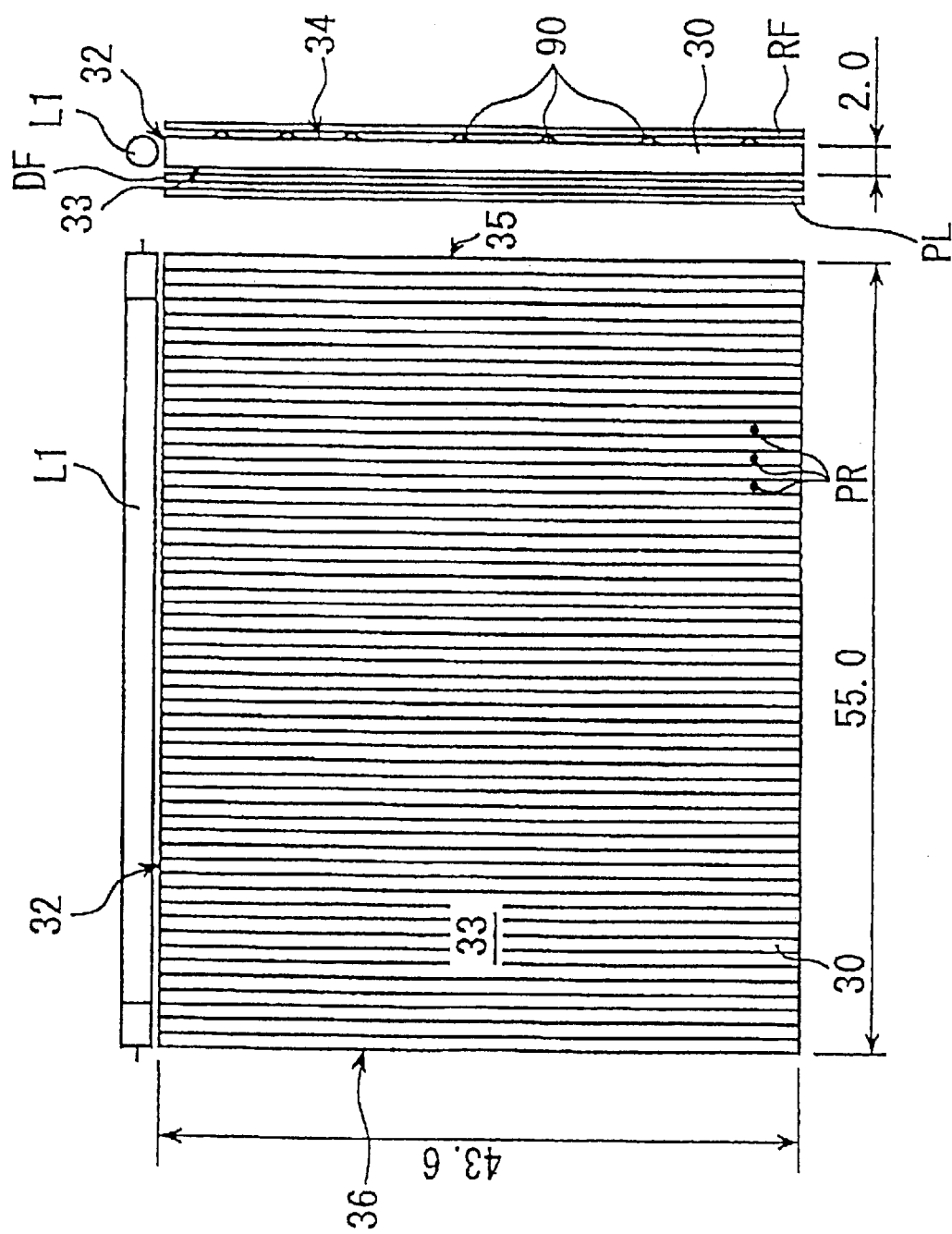

LIGHT GUIDE PLATE, SURFACE LIGHT SOURCE DEVICE AND LIQUID CRYSTAL DISPLAY

BACKGROUND

1. Field of Invention

The present invention relates to a light guide plate which is supplied with light sideways and deflects the light to output from an emission face, further relating to a surface light source device employing the light guide plate as well as to a liquid crystal display employing the surface light source device for back-lighting or front-lighting.

2. Related Art

A surface light source device of a type comprises a light guide plate having an end face, through which light is introduced, and two major faces (i.e. faces larger than end faces) one of which provides an emission face, being employed for various uses such as back-lighting or front-lighting for a liquid crystal display. Basic performance of surface light source devices of such type greatly depends on light guide plates employed therein.

A basic function of a light guide plate is to change a propagation direction (roughly in parallel with an emission face of the light guide plate) of light introduced into the light guide plate through a side end face so that the light is emitted through the emission face. As known well, a simply transparent light guide plate without any modification is capable of deflecting light little, providing unsatisfactory brightness. Consequently, any means for promoting emission through the emission face is required.

In general, means for promoting emission from a light guide plate relies upon one of the followings or some of them as combined:

(1) Scattering power within the light guide plate (light scattering guide plate);
(2) Emission face (a major face) provided with light diffusibility;
(3) Back face provided with light diffusibility;
(4) Emission face provided with light-refractive unevenness; and
(5) Back face provided with light-refractive unevenness.

Ways based on (1) provide uniform and highly effective emission with ease. However, the emission is subject to have a preferential direction much inclined with respect to a frontal direction. Usually, the inclination is about 60 to 75 degrees to a normal with respect to the emission face.

Accordingly, an element for modifying the inclined direction to the frontal direction (prism sheet) must be arranged. A light diffusion sheet, if alternatively employed, can bring some increase in frontal emission. However, light diffusion involves a loss of light because of divergence toward useless directions.

Ways based on (2) or (3) hardly provide a highly effective emission. The emission is also preferentially directed to oblique directions as in the case of (1). An increase light diffusibility checks the efficiency because of factors such as wide range scattering or absorption by light scattering elements (for example, by a white ink).

Although ways based on (4) are capable of causing light to escape from the emission face with ease, positive direction conversions are less effected. Accordingly, emission with a high efficiency is less expected. In particular, it is not advantageous that they fail to generate light rays which travel from the back face to the emission face.

To the contrary, ways based on (5) positively generate light which travels from a back face to an emission face of a light guide plate, being free from wide range light scattering. Accordingly, the ways are latently capable of effectively generating emission directed to roughly frontal directions.

FIG. 1a to FIG. 1c illustrate examples based on the above (5). Referring to the figures, reference number 1 indicates a light guide plate made of a transparent material such as acrylic resin, the plate having a side end face to provide an incidence face 2. A primary light source L is disposed beside the incidence face 2 to be supplied with light from the primary light source L. One of two major faces 3 and 4 of the light guide plate 1 provides an emission face 3. The other major face (called "back face") is provided with a great number of recesses 5 having a cross section including slopes 5a and 5b.

The primary light source L emits light which is introduced into the light guide plate 1 through the incidence face 2. Upon encountering a recess, a propagation light within the light guide plate 1 (as represented by G1, G2) is inner-reflected by a slope 5a to be directed to the emission face 3. Inner-incidence angle is denoted by θ and emission beams derived from beams G1, G2 are denoted by G1', G2'. In other words, the slope 5a, which is relatively near to the incidence face 2 (or primary light source L) compared with the other slope 5b, provides an inner-reflection slope for direction conversion. This effect is sometimes called edge-lighting effect.

The recesses 5 are formed like dots or linear channels. As shown in FIG. 1a to FIG. 1c, formation pitch d, depth h or slope inclination φ of the recesses 5 is varied depending on distance from the incidence face 2. Such variations prevent brightness on the emission face 3 from varying depending on distance from the incidence face 2.

However, prior arts as shown in FIG. 1a to FIG. 1c are subject to the following problems.

1. Light is hard to reach a region behind the slope 5b as viewed from the incidence face 2. Therefore, a reduction of formation pitch d hardly rises direction conversion efficiency and the emission face 3 is apt to show an unevenness in brightness.

2. Sufficient direction control in a plane parallel to the incidence face 2 is not effected. For instance, if beams G1 and G2 are parallel to the emission face 3 but not perpendicular to the incidence face 2, emission beams G1' and G2' will be diverged to the right or left as viewed from the incidence face 2. Actually, there is considerable light components which propagate not perpendicularly with respect to the incidence face 2 within the light guide plate 1. Accordingly, it is difficult to provide an emission to a desirable angle or within a desirable angle range spatially (i.e. in both planes parallel and vertical to the incidence face 2).

3. Light leaking through the back face 4 occurs easily because direction conversion for generating light directed to the emission face 3 relies upon once-occurring-reflection (at slope 5a). That is, the condition for total reflection is broken with ease at the reflection for direction conversion. For instance, if beams G1' and G2' are required to be directed to approximately frontal directions, inner-incidence angle θ is set at about 45 degrees. This is roughly the same as the critical angle for an interface between air and acrylic resin which is a typical material. Therefore, a considerable part of light propagating slightly downward leaks through the slope 5a.

The present inventor proposed a light guide plate and surface light source device/LCD employing the light guide plate, which were disclosed Japanese Patent Application Tokugan-Hei 11-38977. A brief explanation of the proposed technique is as follows, being aided by FIG. 2 and FIGS. 3a, 3b.

FIG. 2 is a plan view showing an arrangement of a surface light source device as viewed from a back side of a light guide plate arranged therein, the arrangement being disclosed in the above-mentioned patent application.

FIG. 3a is a partially enlarged perspective view of the light guide plate employed in the surface light source device shown in FIG. 2, and FIG. 3b is a partially enlarged view of one of projection-like micro-reflectors formed on a back face of the light guide plate. Note that sizes of micro-reflectors are exaggerated for the sake of explanation.

Referring to FIG. 2, a light guide plate 10 made of a transparent material. The light guide plate 10 has an end face (minor face) to provide an incidence face 12. A back face referenced with numeral 14 is a back face provided by one of major faces. The other major faces provides an emission face (See FIG. 3a). The light guide plate 10 has right and left side end faces (minor faces) 15 and 16.

A rod-like primary light source (cold cathode lamp) L is disposed along the incidence face 12 which is supplied with light from the light source. Both ends of the cold cathode lamp L are electrode portions EL1 and EL2 between which a light emitting portion extends with a length somewhat smaller than that of the incidence face 12. Such a design is often employed in order to avoid the electrode portions EL1, EL2 from sticking out.

According to a basic feature of the technique disclosed in the above patent application, a great number of projections 20 are formed on the back face 14.

The primary light source L emits light which is introduced into the light guide plate 10 through the incidence end face 12. An inner propagation light travels within the light guide plate 10 and is reflected generally twice when entering into one of the micro-reflectors 20, with the result that a light directed to the emission face 13 is produced. That is, the micro-reflectors function as "direction-conversion means for converting an input light into an inner output light"

As shown in FIGS. 3a and 3b, each of the micro-reflectors 20 is configured as to be projected from a general plane (level plane) representative of the back face 14. The illustrated micro-reflector 20 has a shape like a projection having six faces 21, 22, 23, 24, 27 and 28.

The faces 21 and 22 provide a guiding portion to effect a smooth light input for direction-conversion. The faces 21 and 22 meet each other at a ridge portion 26. On the other hand, the faces 23 and 24 effect reflections twice for direction-conversion, producing an inner output light. The faces 23 and 24 meet each other at a ridge portion 25. The faces 27 and 28 are side walls limiting width of the micro-reflector.

Orientation of each micro-reflector is represented by an extending direction of the micro-reflector. In the illustrated example, the ridges 25 and 26 have a straight-projection-line provided by "projecting them onto the general plane representative of the back face 14". Arraying of the micro-reflectors is designed so that they align to a direction corresponding to light coming direction in order to rise input efficiency and direction-conversion efficiency.

A great part of input light represented by beams H1, H2 is incident to the incidence face 12 along a direction approximately perpendicular to the incidence face 12. However, light that is actually inputted into the projections is not precisely parallel to the general plane of the back face 14 but progresses somewhat downward (so as to approach the back face 14).

Light that progresses precisely parallel to the general plane of the back face 14 or approaches the emission face 13 advances deep without being inputted to projections 20. Consequently, the projections 20 do not obstruct light advancing and give no region little light reaches, thereby effecting contrary to recesses (See FIG. 1).

Viewing from the standpoint of the beams H1 and H2, the reflection faces 23 and 24 of the conversion output portion configurate a valley getting tapered forward. The ridge 25 corresponds to a bottom of the valley. The valley gets narrower and shallower according to distance from the guide portion. Therefore, a great part of light H1 and H2 entering the valley via the guide portion is inner-reflected by one of the reflection faces 23 and 24, and then inner-reflected again by the other faces 24 or 23.

As a result, a light propagation direction is converted twice three-dimensionally to produce inner output light J1, J2 directed to the emission face 13. The inner output light J1, J2 produce in such a way is emitted from the emission face 13 and used for illuminating an object such as LCD panel. Various variations of arrangement and orientation of the micro-reflectors 20 are allowed. The example shown in FIG. 2 is subject to the following rules.

1. Formation density (covering rate) tends to increase according to distance from the incidence face 12. This prevents brightness on an emission face from varying depending on distance from the incidence face 12.

2. Micro-reflectors 20 are arranged in corner areas A, B near to the electrode portions EL1, EL2 at a specially large density. This prevents, together with orientation of the following item 3, prevents dark areas corresponding to the areas A, B from emerging on the emission face.

3. Micro-reflectors 20 are orientated so as to be approximately vertical to the incidence face 12 almost over the back face 14, with their guide portions being directed to the incidence face 12. In other words, each micro-reflector 20 is orientated so that its conversion output portion has a ridge 25 which extends approximately at the right angle with respect to the incidence face 12.

4. In the corner areas A, B, micro-reflectors 20 are obliquely orientated with respect to incidence face 12, with guide portions being directed to the light emitting portion of the cold cathode lamp L. This causes these micro-reflectors 20 to be orientated corresponding to light coming directions, thereby rising direction conversion efficiency.

5. In both side edge portions 15, 16 except the corner areas A and B, micro-reflectors 20 are orientated so as to be inclined at small angles with respect to the incidence face 12, with guide portions being directed to the light emitting portion of the cold cathode tube L. This causes these micro-reflectors 20 to be orientated corresponding to light coming directions, as the above item 4, thereby rising direction conversion efficiency.

If conversion output portions (directions of inner reflection faces 23 and 24) of micro-reflectors 20 located in a certain range from both side end faces 15 and 16 are designed the so that an inner output light is inclined toward a center portion of the light guide plate 10, an emission with converging property is produced.

6. Micro-reflector arrangement does not have a strong regularity such that many micro-reflectors 20 align along a straight line. This makes the micro-reflectors 20 more inconspicuous. And besides, if incorporated in a liquid crystal display, the micro-reflectors can avoid from bringing Moire fringes which would be caused by an overlapping relation with a matrix-like electrode arrangement.

It is possible to heighten the performance of a light guide plate and surface light source device/LCD employing the light guide plate, which were disclosed in the above propose, by adding contrivances as above.

However, the above-proposed technique remains a problem unsolved. That is, the proposed technique, if applied, a fine unevenness in brightness appears on the emission face of the light guide plate 10 corresponding to size and arrangement pitch of the micro-reflectors 20. This gives a viewer a non-smooth visual feeling (a feeling of glaring).

This problem is supposed to arise due to a fact that a roughly almost of the inner output light of the micro-reflectors 20 escapes and is emitted from the emission face at the first chance with ease, as mentioned with referring to FIGS. 3a and 3b. In this Specification, such an escaping (light) at the first chance is called "direct escaping (light)"

Needless to say, such direct escaping occurs generally corresponding to positions of the micro-reflectors 20. On the other hand, an efficient emission can not be expected in a blank region (a flat region on the flat back face 14) without micro-reflectors 20 among the micro-reflectors. As a result, a fine unevenness in brightness appears on the emission face.

In the instant Specification, the term "indirect escaping" or "indirect escaping light" means a phenomena or escaping light which occurs or generates at second or later chances after being inner-reflected by the emission face. Simply saying, if the direct escaping light is produced to much as compared with the indirect escaping light, a fine unevenness in brightness will appear.

This problem will be relaxed to a degree by arraying the micro-reflectors 20 at a high density. However, arraying density is subject to a practical limit.

OBJECT AND SUMMARY OF INVENTION

The present invention aims to overcome the above-mentioned problem of the proposed technique. Accordingly, an object of the present invention is to provide a light guide plate which is improved not only as to have a superior direction-conversion function for light introduced sideways but also as to hardly show a fine unevenness in brightness on an emission face.

Another object of the present invention is to provide a surface light source device which is improved as to produce an output illumination not only with a high efficiency but also with a high-quality involving little fine unevenness in brightness by means of the improved light guide plate. Still another object of the present invention is to provide a liquid crystal display which gives a high-quality display screen by applying the improved surface light source device to an arrangement for lighting a LCD panel.

The present invention is according to a basic idea (as proposed in the above patent application) that inner reflections caused twice at inner surfaces of a micro-reflector is a direction-conversion process, and, further to the basic idea, the present invention employs a great number of projection rows formed on an emission face as to cause the emission to have diversified traveling histories, thereby solving the problem.

In the first place, the present invention improves a light guide plate comprising two major faces to provide an emission face and a back face, and an incidence end face for introducing light.

According to a feature of the present invention, the back face of the light guide plate is provided with a great number of projection-like micro-reflectors for direction-conversion of light, each of which includes a guiding portion and a conversion output portion that includes a ridge portion and a pair of first and second reflection surfaces formed on both sides of the ridge portion respectively as to be inclined with respect to a general plane representative of the back face.

And the ridge portion and the first and second reflection surfaces form a valley in the micro-reflector, the valley tending to get narrower and shallower as being distant from the guiding portion.

Through this, an inner input light reaching the valley via the guiding portion is reflected by one of the first and second reflection surfaces and is further reflected by the other of the first and second reflection surfaces as to produce an inner output light directed to the emission face.

On the other hand, the emission face is provided with a great number of projection rows running approximately at right angles with respect to the incidence end face. This configuration causes some of the inner output light to escape through the emission face and the other to be inner-reflected.

The first and second reflection surfaces are inclined with respect to the general plane representative of the back face preferably at inclination angles different from each other, respectively. The ridge portion extends in a direction which may varies depending on location on the back face. A directional distribution of the emission from the emission face can be controlled depending on the inclinations of the first and second reflection surfaces and an extending-direction distribution of the ridges.

The present invention provides an improved surface light source device which employs the above-mentioned light guide plate. The present invention improves a surface light source device comprising at least one primary light source and a light guide plate having two major faces to provide an emission face and a back face, and an incidence end face for introducing light from the primary light source.

Corresponding to the above-mentioned features of the light guide plate, the back face of the light guide plate is provided with a great number of projection-like micro-reflectors for direction-conversion of light. Each of the micro-reflectors includes a guiding portion and a conversion output portion provided with a ridge portion and a pair of first and second reflection surfaces formed on both sides of the ridge portion respectively.

The ridge portion and the first and second reflection surfaces form a valley in the micro-reflector, the valley being configurated as to tend to get narrower and shallower as being distant from the guiding portion.

Through this, an inner input light reaching the valley via the guiding portion is reflected by one of the first and second reflection surfaces and is further reflected by the other of the first and second reflection surfaces as to produce an inner output light directed to the emission face.

On the other hand, the emission face is provided with a great number of projection rows running approximately at right angles with respect to the incidence end face. This configuration causes some of the inner output light to escape through the emission face and the other to be inner-reflected.

Through this function, direct escaping of the inner output light is controlled. A remarkable large part of the inner-reflected light, which has failed to escape, can have a chance of indirect escaping after travelling along various paths. There is only a slight correspondence between the locations of the micro-reflectors and the positions at which the indirect escaping occurs, with the result that the above-described fine unevenness in brightness renders inconspicuous.

It is preferable to dispose a reflection member along the back face of the light guide plate in order to increase the indirectly escaping light. The reflection member reflects and returns the light, which has been inner-reflected at the projection rows and leaked through the back face, to the light guide plate, thereby giving the light chances of indirect escaping.

Each conversion output portion may has a ridge extending in a direction which varies depending on location on the back face. as to approximately accord with a light coming direction. A directional distribution of the emission from the emission face may be controlled depending on the extending direction distribution of ridge.

Each ridge portion of a conversion output portion may extends in a direction which varies depending on location on the back face as to approximately accord with a light coming direction. Alternatively, Each ridge portion of a conversion output portion may extends in a direction which varies depending on location on the back face as to be inclined at a small angle with respect to a light coming direction.

The surface light source device improved as above may be adopted as a surface light source device for a backlighting-type LCD having a LCD panel illuminated from the back side or for a frontlighting-type LCD having a LCD panel illuminated from the front side (i.e. from the viewer's side). In these cases, the performance of the surface light source device is reflected on that of the LCD. Thus, the LCD in accordance with the present invention has a display screen which looks well luminous.

BRIEF DESCRIPTION OF DRAWING

FIGS. 4a and 4b illustrate an outlined arrangement of an embodiment in accordance with the present invention, FIG. 4a being a plan view and FIG. 4b being a side view as viewed from the right hand in FIG. 4a;

EMBODIMENT

Figure 5:
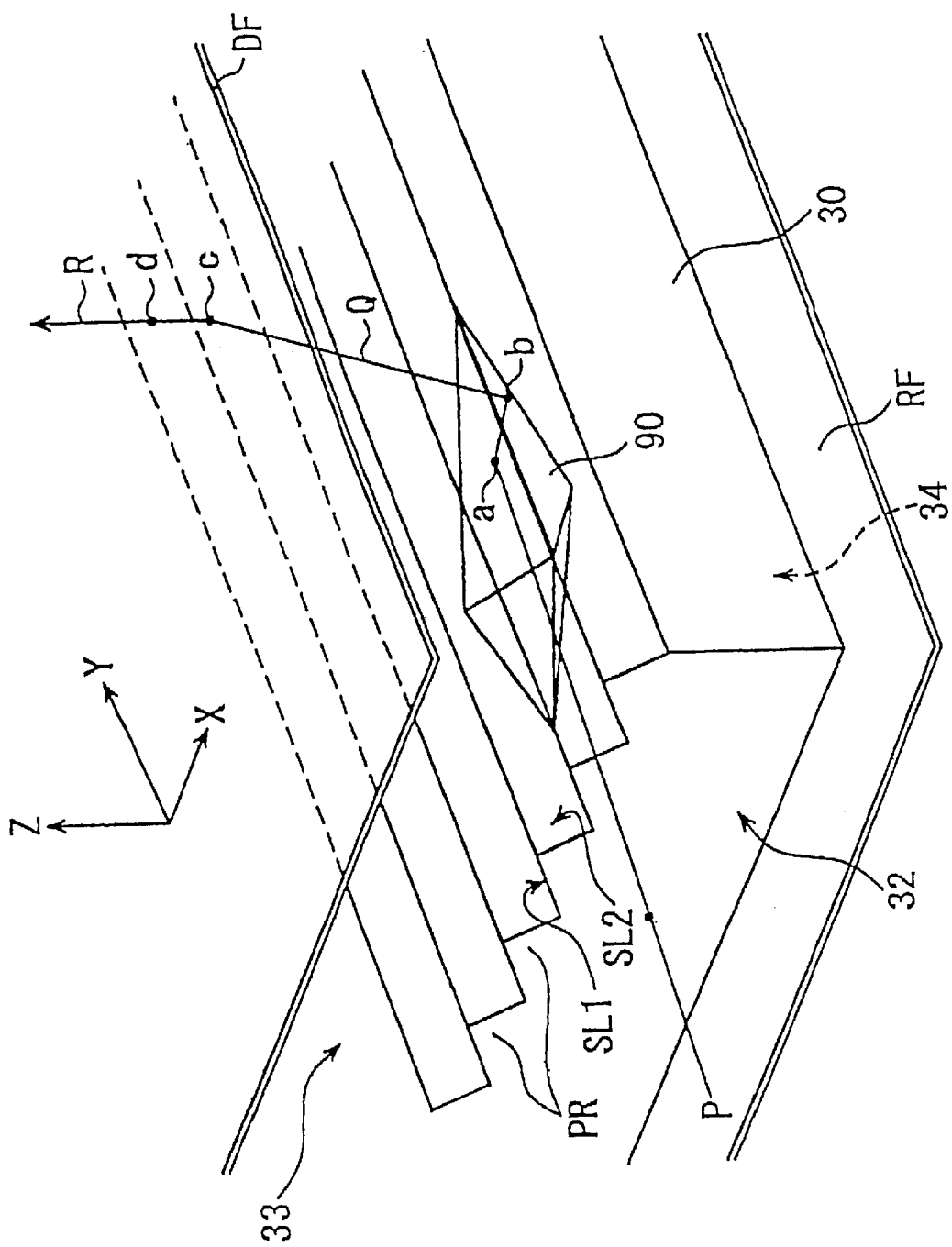
FIG. 5 is an enlarged perspective view of a micro-reflector and its surroundings in the embodiment, wherein typical light paths are shown.

FIGS. 4a and 4b illustrate an outlined arrangement of an embodiment in accordance with the present invention. FIG. 4a is a plan view and FIG. 4b is a side view as viewed from the right hand in FIG. 4a. FIG. 5 is an enlarged perspective view of a micro-reflector and its surroundings in the embodiment, wherein typical light paths are shown.

In FIG. 4a, a diffusing plate and LCD panel is omitted in the illustration. In FIG. 5, the LCD panel is omitted in the illustration. Size values in mm are merely examples.

It is noted that illustration sizes of micro-reflectors or projection rows are exaggerated, as required, for the sake of easy understandings. LCD panel PL is merely a typical object to be illuminated, and accordingly, other objects to be illuminated may be arranged depending on uses.

In the first place, referring to FIGS. 4a and 4b, an incidence end face 32 is provided by a side end face of a light guide plate 30 made of a transparent material such as acrylic resin, cycloorefinic resin or polycarbonate (PC). A rod-like primary light source (cold cathode lamp) L1 is disposed along the incidence end face 32 to which light is supplied. Side end faces on the right and left hands viewing from the incidence end face 32 provide side faces 35 and 36.

The light guide plate 30 has a pair of major faces 34 and 35 one of which provides an emission face 33. The other face (i.e. back face) 34 is provided with a great number of micro-reflectors 90. A reflection member RF is disposed along the back face 34. The reflection member RF has a reflection surface facing to the back face 34. The reflection surface is preferably provided with a diffusive reflectivity. The reflection member RF may be, for instance, a white PET film.

Alternatively, the reflection member RF may have a regular reflection surface, for example, provided by aluminum foil. It is noted that the reflection member RF may be not a sheet-like member. For instance, a reflection surface may be provided by an inner surface of a frame supporting the light guide plate 30 and other members.

Referring to FIGS. 4 and 5 together, the emission face 33 is provided a great number of projection rows PR running approximately at right angles with respect to the incidence end face 32. A well-known LCD panel PL is disposed on the outside of the emission face 33 across a diffusion plate DF, providing a backlighting-type arrangement of LCD. The diffusion plate has a weak diffusion ability, possibly being omitted.

Referring to FIG. 5, the primary light source L1 emits light which is represented by beam P. This beam P is introduced into the light guide plate 30 through the incidence end face 32 and further travels within the light guide plate 30 to enter into one of the micro-reflectors 90 to become an inner input light (inner input beam) to the micro-reflector. This input beam P are reflected generally twice (at points a and b) to become an inner output light Q travelling toward the emission face 33.

Each of the projection rows PR formed on the emission face 33 is composed of a pair of slopes SL1 and SL2. Therefore the inner output light Q reaches one SL1 or the other SL2. Some of the reaching light escapes to the ambience of the light guide plate 30 (at point c) depending on inner-incident angle to the slope SL1 or SL2, providing a directly escaping light (directly escaping component) R.

The rest is inner-reflected and a remarkably large part of the inner-reflected component comes to the emission face 33 again after traveling along various paths. Thus, the second or later chances of escaping are generated at the emission face 33. Indirectly escaping light produced at such second or later chances is included additionally in the illumination output R.

The projection rows PR formed on the emission face 33 have a function of controlling the ratio between the direct escaping light and the direct escaping light. Provided that no projection row PR is formed on the emission face 33, almost all of the inner output light will directly escape out, causing a fine unevenness in brightness as forementioned.

The emission face 33 provided with the projection rows PR gives a rather reduced direct escaping light and a relatively increased indirect escaping light with ease. The indirect escaping light reaches the emission face 33 via various light paths. Therefore, there is a low probability that a direct escaping light and an indirect escaping light escape at the same point. As a result, as a whole, escaping positions are broadly dispersed over the emission face 33, which prevents a fine unevenness in brightness from appearing.

The light inner-reflected at the slope SL1 or SL2 is returned to the back face 34 and some remarkable part of the returned light leaks once out of the light guide plate 30 through the back face 34. The reflection member RF returns the leaking light into the light guide plate 30 to cause the light to have a chance of (indirect) escaping from the emission face 33 again. As understood from this, it is preferable particularly to dispose a reflection member RF along the back face 34. It should be noted, however, that some quantity of indirect escaping light can be produced even if the reflection member RF is omitted.

The illumination output R including both direct and indirect escaping light from the light guide plate 30 passes through the diffusion plate DF (at point d) and then supplied to the LCD panel PL (FIG. 4b). Thus supplied light contributes to display operation according to a well-known principle. The LCD panel PL shows a superior display screen quality because it is supplied with the illumination output without fine unevenness in brightness.

Figure 3A:
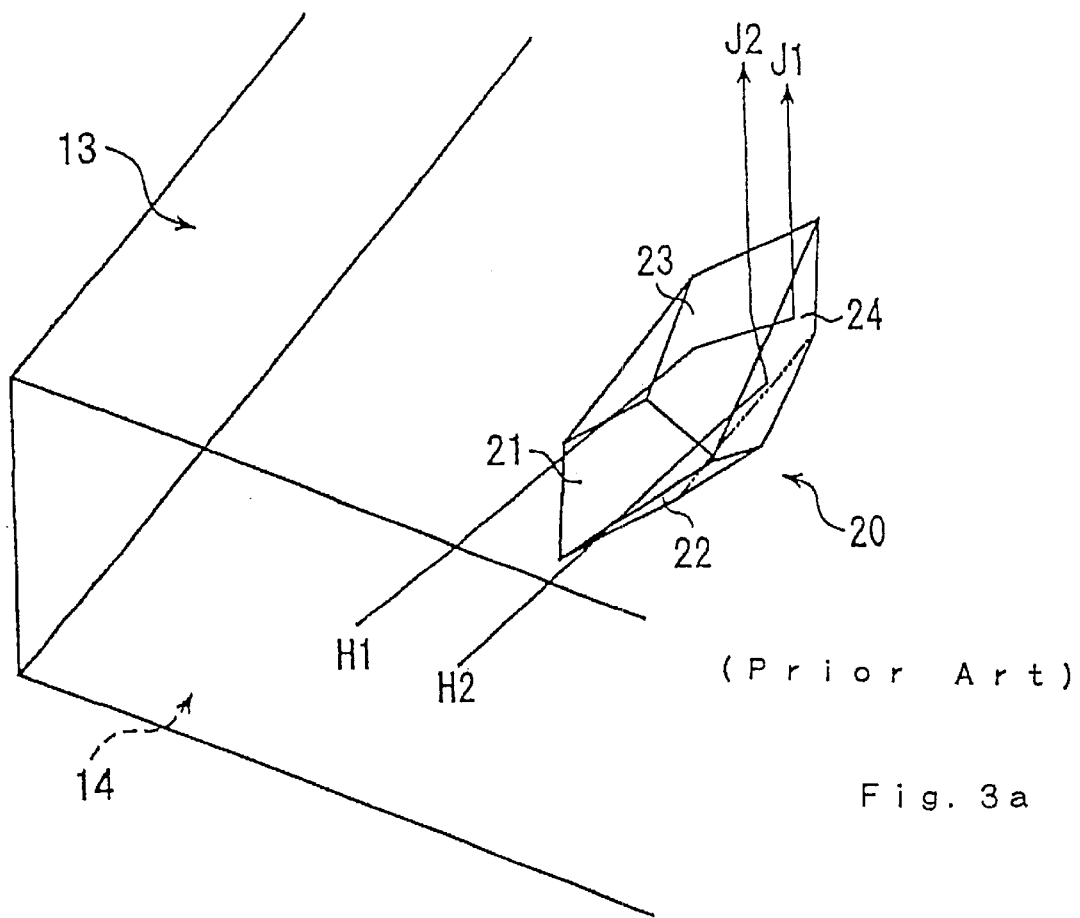
FIG. 3a is a partially enlarged perspective view of the light guide plate employed in the surface light source device shown in FIG. 2.
Figure 3B:
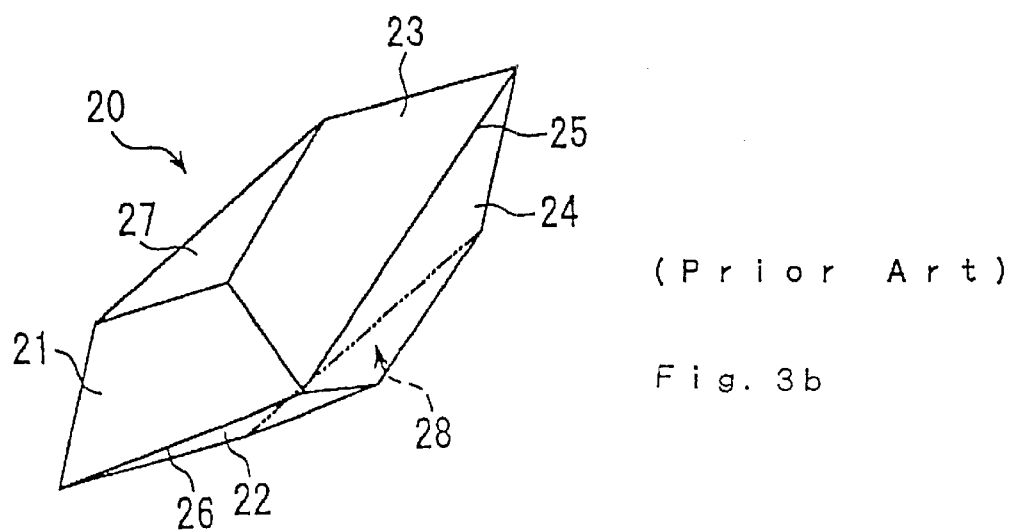
FIG. 3b is a partially enlarged view of one of projection-like micro-reflectors formed on a back face of the light guide plate.
Figure 6:
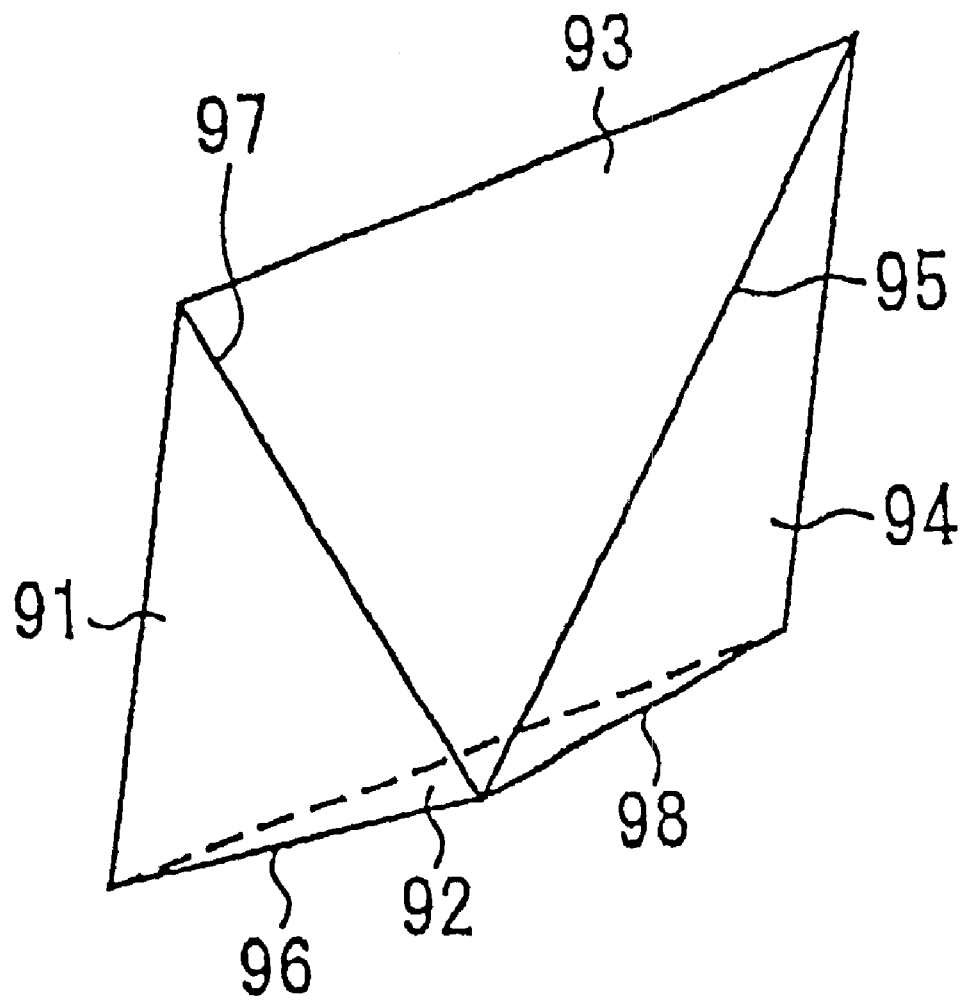
FIG. 6 is an enlarged perspective view of the micro-reflector itself employed in the embodiment.
Figure 7A:
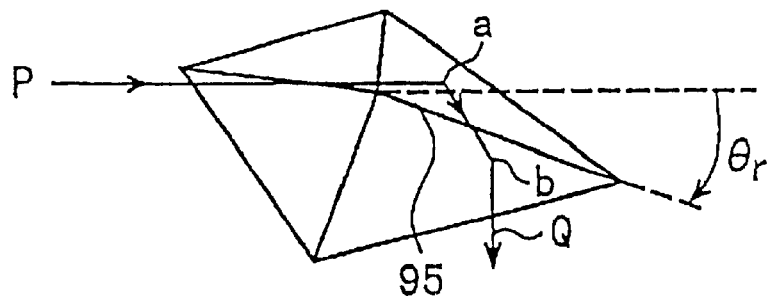
FIGS. 7a through 7c depict one micro-reflector and its surroundings as from three directions, wherein a path of representing beam P is shown, FIG. 7a being a view from +Z direction, FIG. 7b being a view from +X direction and FIG. 7c being a view from +Y direction.
Figure 7B:
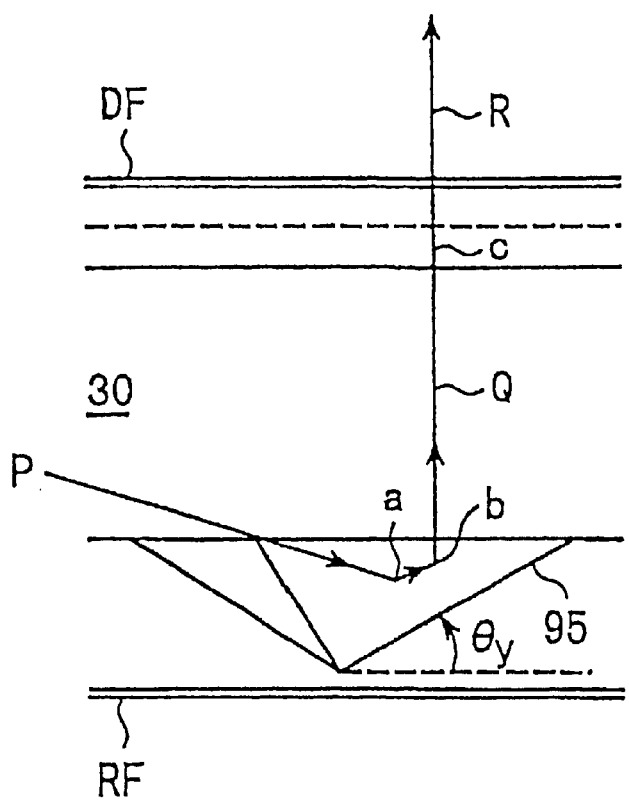
Figure 7C:
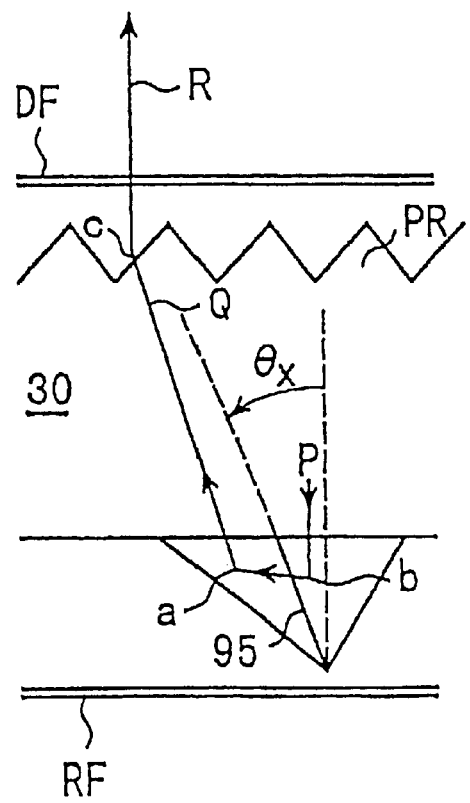

Each of the micro-reflectors 90 employed in this embodiment has a shape similar to that shown in FIG. 3b. FIG. 6 is an enlarged perspective view of the micro-reflector itself. FIGS. 7a through 7c depict one micro-reflector and its surroundings as from three directions, wherein a path of representing beam P is shown, FIG. 7a being a view from +Z direction, FIG. 7b being a view from +X direction and FIG. 7c being a view from +Y direction.

As shown in FIG. 6, the micro-reflector 90 has a shape like a block having four faces 91 through 94. The faces 91 through 94 are formed as to be inclined with respect to a general plane representative of the back face 34. The faces 91 and 92 provide a guiding portion to effect a smooth light input for direction-conversion, meeting each other at a ridge portion 96.

On the other hand, the faces 93 and 94 effect reflections twice for direction-conversion, producing an inner output light. The faces 93 and 94 meet each other at a ridge portion 95. The faces 91 and 93 meet each other at a ridge line 97 and the faces 92 and 94 meet each other at a ridge line 98.

Referring to FIGS. 5 and 6 together, it is understood that the reflection surfaces 93 and 94 of the conversion output portion look like a valley as viewed from the standpoint of beam P. The ridge 95 corresponds to the bottom of the valley. The valley gets narrower and shallower as being distant from the guiding portion. This configuration causes reflections twice (at a and b) as above-mentioned with ease. As a result, the direction of beam P is three-dimensionally converted twice and an inner output light Q directed to the emission face 33 is produced.

It is noted that the reflection surfaces 91 and 92 of the guiding portion in the embodiment also look like a valley as viewed from the standpoint of beam P. The ridge 96 corresponds to the bottom of this valley. This valley gets narrower and shallower as being distant from the conversion output portion.

It should be noted that a travelling direction of an inner output light Q can be controlled with in a remarkable range by adjusting a direction of micro-reflector 90 three-dimensionally. Each micro-reflector 90 has a three-dimensional direction degree of freedom of which is "3", being possible to be expressed by three independent direction parameters, $\theta r$, $\theta x$ and $\theta y$, as shown in FIGS. 7a through 7c.

Parameter $\theta r$ is "an angle at which a line produced by projecting a ridge portion 95 onto a XY-plane (parallel with a general plane representative of the extending direction of the back face 34) extends with respect to +Y-axis direction (a depth direction of the light guide plate 30 as viewed from the side of the incidence end face 32). Relative-angular distribution of inputting light to a micro-reflector 90 is mainly influenced by parameter $\theta r$. Parameter $\theta r$ is preferably designed generally as to be zero degree or within a range such as from 0 to ±18 degrees.

In the example shown in FIGS. 4 and 5, the maximum input light quantity is obtained when $\theta r$ is approximately 0 degree because light is supplied mainly form −Y-direction to almost all area in the back face 34 of the light guide plate 30. However, it brings no problem to adjust $\theta r$ within a small range in order to three-dimensionally control a direction of an inner output light Q.

To the contrary, if parameter $\theta r$ is too large, for example, 45 degrees or more, the micro-reflector is apt to have a much reduced input light quantity, being generally not suitable for practical uses. However, it should be noted, as mentioned later, that angle $\theta r$ may be adjusted in a special manner at locations receiving light from greatly inclined light coming directions, for example, at corner portions at both ends of the incidence end face 32.

In the next place, parameter $\theta y$ is defined as "an angle at which a line produced by projecting a ridge portion 95 onto a YZ-plane (parallel with the side faces 35, 36) extends with respect to +Y-axis direction (a depth direction of the light guide plate 30 as viewed from the side of the incidence end face 32). A direction, regarding in a YZ-plane, of an output light Q is mainly influenced by parameter $\theta y$.

In the example shown in FIG. 7b, an output light Q is directed as to have a Y-component of zero. If $\theta y$ is reduced as compared with the shown state, the direction of the inner output light Q will be inclined as to rotate clockwise in the illustration.

Further, parameter $\theta x$ is defined as "an angle at which a line produced by projecting a ridge portion 95 onto a ZX-plane (parallel with the incidence end face 32) extends with respect to +Z-axis direction (a thickness direction of the light guide plate 30). A direction, regarding in a ZX-plane, of an output light Q is mainly influenced by parameter $\theta x$.

In the example shown in FIG. 7c, parameter $\theta y$ is designed so that an illumination output R generally frontal regarding in a ZX-plane is obtained after an inner incidence to one of the slopes SL1 of a projection PR at a small angle.

In general, by adjusting the parameters, in particular θx, an inclination angle of face 93 with respect to a general plane representative of the back face 34 become unequal to an inclination angle of face 94 with respect to the general plane. For example, if the faces 93 and 94 are formed symmetrically with respect to the ridge portion 95, under a condition of θx≠0, the faces 93 and 94 have inclination angles different from each other with respect to the general plane representative of the back face 34.

Figure 8:
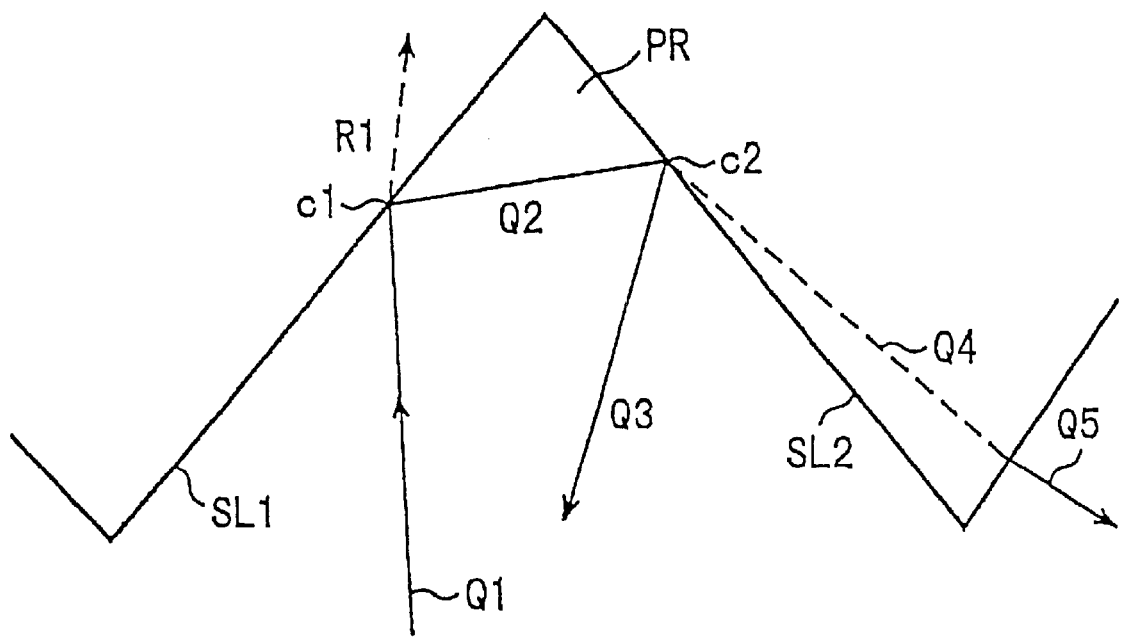
FIG. 8 shows a typical light path of inner output light Q1, which travels toward +Z direction regarding in XZ plane, to illustrate a function of projection rows.

A further discussion on operations of the projection rows PR is as follows. FIG. 7c shows a light path along which an inner output light Q is converted into an output illumination R directed to an approximately frontal direction, wherein output beams in practice distribute around the illustrated direction of the put light Q. FIG. 8 shows a typical light path of an inner output light Q1 directed in parallel to Z-axis regarding in a Zx-plane.

As illustrated, the inner output light Q1 is separated, on being inner-incident to the slope SL1, into a beam Q2 and a direct escaping light R1 depending on inner-incident angle. It is noted that total reflection occurs and no direct escaping light R1 is produced if the inner-incident angle is not smaller than the critical angle. And, even if the inner-incident angle is smaller than the critical angle and some direct escaping light R1 is produced, there is only a small difference between the inner-incident angle and the critical angle because the slope SL1 is inclined. For example, if the projections PR are made of PMMA (refractive index; 1.492), the critical angle is about 43 degrees. An inner reflection beam Q2 is inner-incident to the other slope SL2. This causes the beam Q2 to be separated into a beam Q3 and beam Q4 depending on inner-incident angle. It is noted that total reflection occurs and the beam Q4 is not produced if the inner-incident angle is not smaller than the critical angle. Anyway, neither the beam Q3 nor Q4 becomes a direct escaping light. Although almost all of the beam Q4 goes out of the light guide plate 30 once, the beam Q4 is not regarded as a direct escaping light because almost of all of the beam Q4 impinges immediately to an adjacent projection and travels along paths quite different from the path of the beam R1. A great part of the beam Q4 becomes. a beam Q5 which travels gain within the light guide plate 30.

A great part of various beams, produced in such ways, including Q3, Q5 and others similar to these can have again a chance of escaping from the projection rows PR after travelling along diverse paths. A part of the illumination light consists of beams which have succeeded in escaping to leave the light guide plate 30 at the second or later escaping chances.

It should be noted that only a very small quantity of light like Q3 and Q5 would be produced if the emission face 33 is a flat face without projection rows PR. In such a case, an excessive quantity of direct escaping light would be produced, causing a fine unevenness in brightness to appear.

In other words, the projection rows control the direct escaping light as to be not excessively produced, thereby preventing a fine unevenness in brightness or "a feeling of glaring" from generating. This effect of the projection rows is expected to be subject to diverse variations depending on not only inclination angle β of the slopes SL1, SL2 but also other factors such as configuration (in particular, configuration of each valley of each conversion output portion), size and direction (θr, θy, θx) of each micro-reflector 90, and material (refractive index) of which light guide plate 30 is made. Therefore, the optimum condition is preferably determined in designing.

In the last place, arraying patterns of micro-reflectors is described as follows. Although the present invention requires no particular or absolute condition about arraying patterns of micro-reflectors 90, the micro-reflectors 90 are arrayed preferable so that a uniform brightness distribution is realized overall on the emission face 33.

Figure 9:
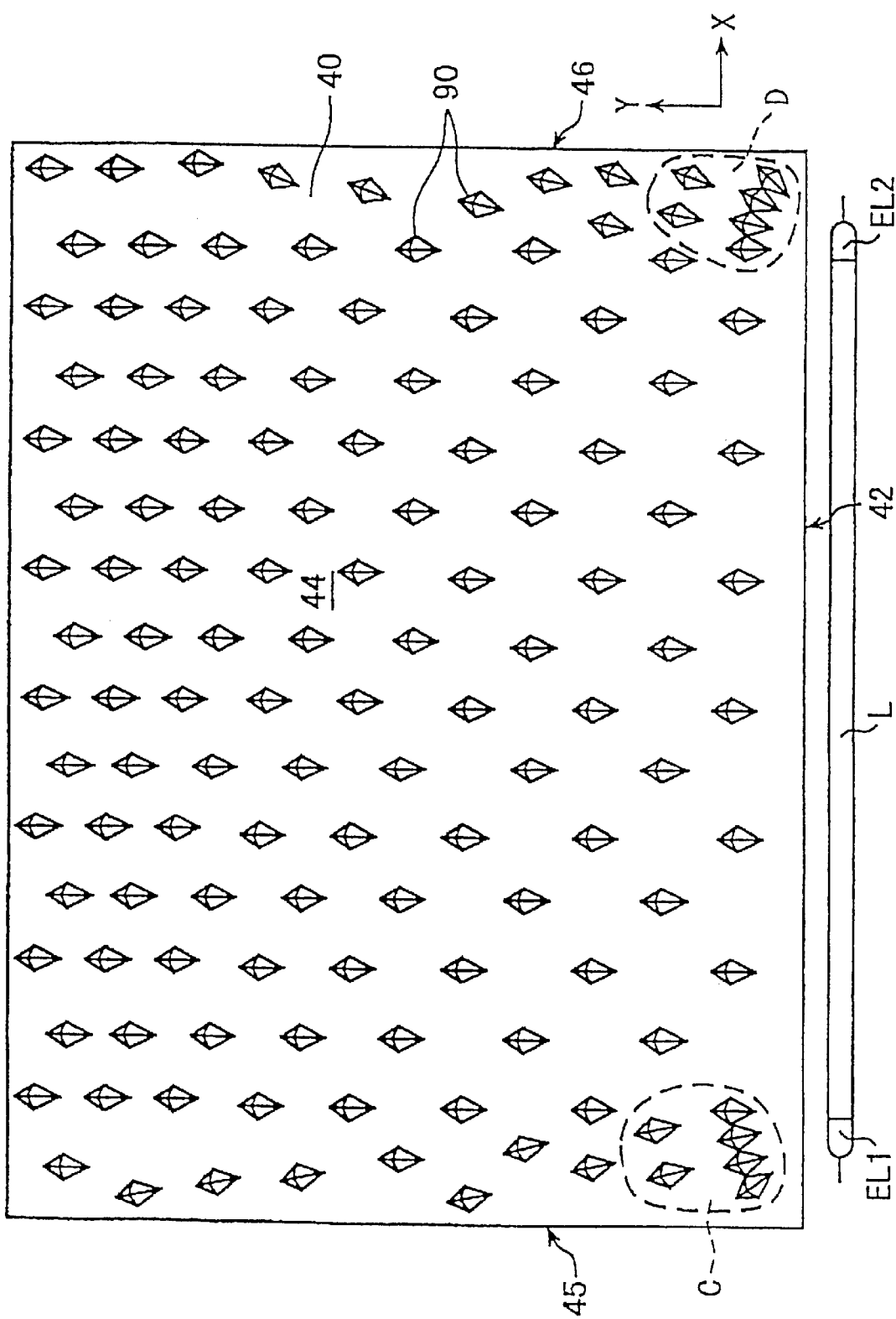
FIG. 9 illustrates an example of array of micro-reflectors.

FIG. 9 illustrates an example of array of micro-reflectors. Referring to FIG. 9, an incidence end face 42 is provided by a side end face of a light guide plate 40 made of a transparent resin. A great number of micro-reflectors 90 are arrayed on a back face 44 which is provided by a major face. The other major face provides an emission face (not shown), and right and left minor faces provide side faces 45 and 46.

Figure 1A:
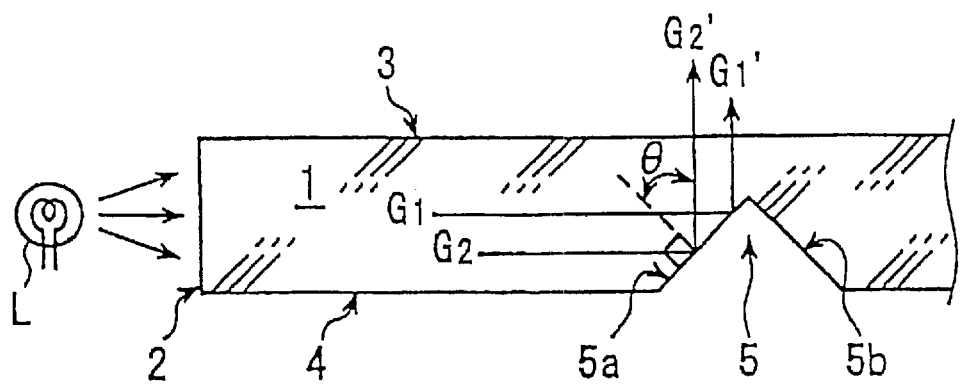
FIGS. 1a through 1c illustrate a prior art, FIG. 1a showing a principle of edge-lighting and FIGS. 1b and 1c showing examples of depressions.
Figure 1B:
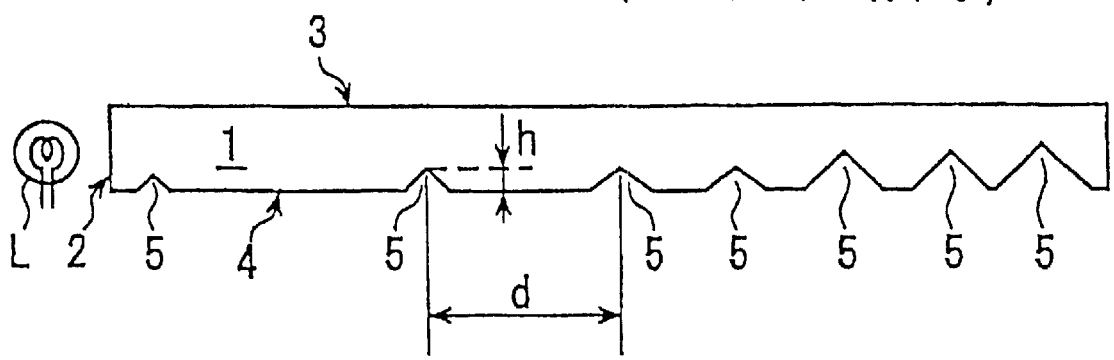
Figure 1C:
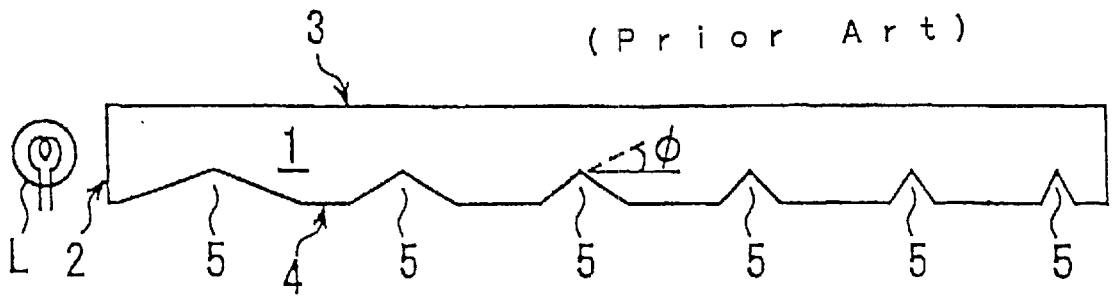
Figure 2:
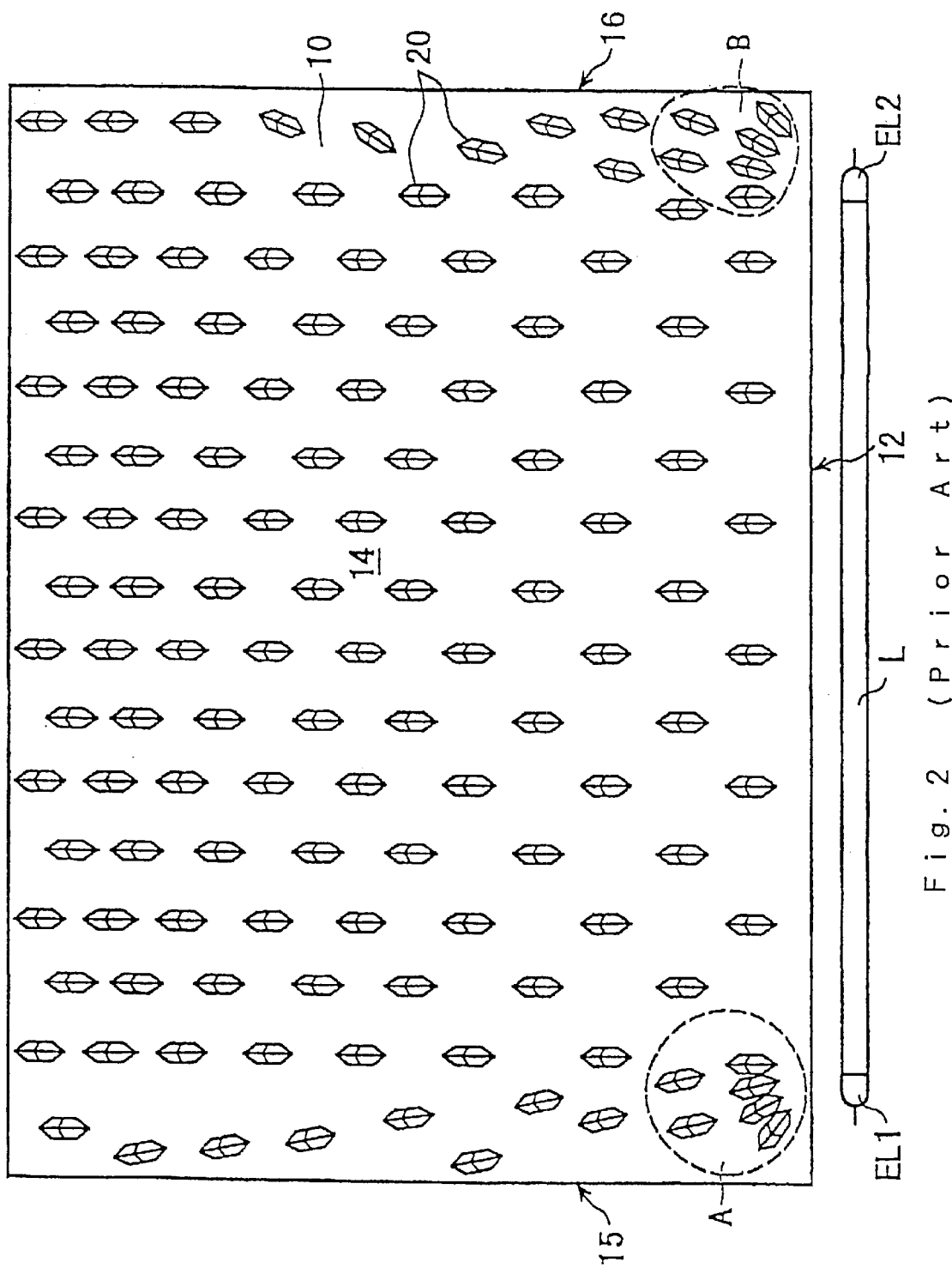
FIG. 2 is a plan view showing an arrangement of a surface light source device as viewed from a back side of a light guide plate arranged therein, the arrangement being disclosed in a preceding patent application.

A primary light source (cold cathode lamp) L is the same one as shown in FIG. 2, being disposed along the incidence end face 42 to supply light thereto. Both ends of the cold cathode lamp L are electrode portions EL1 and EL2 having no emission ability between which an emitting portion extends with length L somewhat shorter than that of the incidence end face 42. An arrangement designed in such a way is employed very often in order to avoid the electrode portions EL1 and EL2 from sticking out.

The primary light source emits light which is introduced into the light guide plate 40 through the incidence end face 42. On the way of propagation within the light guide plate 40, a beam enters a micro-reflector 90 to be reflected generally twice, with the result an inner output light directed to the emission face 33 is produced. Some of the inner output light becomes a direct escaping light and some of the other becomes an indirect escaping light. Detailed configurations and functions of individual micro-reflectors 90 are omitted because of being described already.

An arraying pattern shown in FIG. 9 is the same as one shown in FIG. 2. However, orientations (directions) of the individual micro-reflectors 90 have a degree of freedom (direction parameters θr, θx, θy) as forementioned. It is noted that details of micro-reflectors directions are not expressed in the illustration. However, it is shown that parameter θr=about 0 degree except corner portions C and D. As forementioned, all or a part of the micro-reflectors may have orientations expressed by parameter θr which are rotated clockwise or anticlockwise by a small angle ranging from several degrees to 20 degrees, for example 18 degrees, with respect to the individual orientations shown in FIG. 2.

The illustrated array is subject to the following arraying rules.

1. Formation density (covering rate) tends to increase with an increasing distance from the incidence end face 42. This prevents brightness from varying on the emission face depending on distance from the incidence end face 42.

2. In the corner areas C and D near to the electrode portion EL1 or EL2, micro-reflectors 90 are arrayed at a particularly large density. This, together with the following orientation condition 3, prevents dark regions from appearing in the corner areas C and D.

3. In almost of all of the back face 44, micro-reflectors 90 are orientated as to align to a direction approximately perpendicular to the incidence end face 42 as foredescribed (θr=about 0 degree).

4. In the corner areas C and D, micro-reflectors 90 are orientated as to be much oblique with respect to the incidence end face 42. That is, parameter θr ranges up to about 45 degrees at the maximum. This causes orientations of micro-reflectors 90 to correspond to light coming directions, thereby providing an increased direction conversion efficiency.

Further to the above, in both side portions 45 and 46 except the corner areas C and D, micro-reflectors 90 are orientated as to be slightly oblique with respect to the incidence end face 42. This causes orientations of micro-reflectors 90 to correspond to light coming directions, thereby providing an increased direction conversion efficiency in a way like that mentioned in the above rule 4.

However, as forementioned, it is noted that all or a part of the micro-reflectors may have orientations expressed by parameter θr which are rotated clockwise or anticlockwise by a small angle ranging from several degrees to 20 degrees, for example 18 degrees, with respect to the illustrated individual orientations.

5. Arraying of the micro-reflectors 90 is designed as to avoid having a striking order such that many micro-reflectors just align on a straight line. This renders the micro-reflectors 90 more inconspicuous. And this prevents also Moire stripes which could be caused by an overlapping relation with a matrix-like electrode array when the device is incorporated in a LCD.

Figure 10:
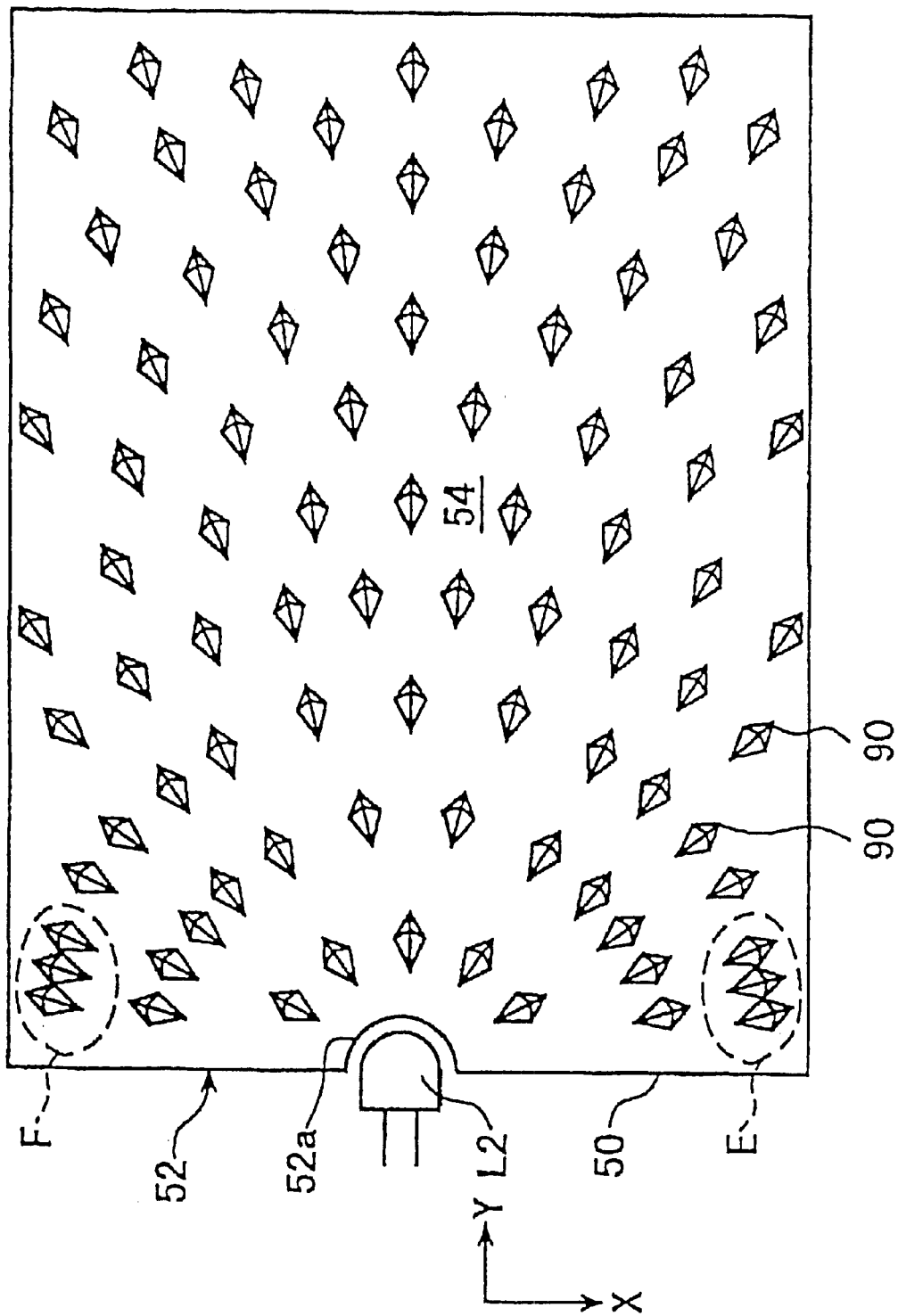
FIG. 10 illustrates another example of array of micro-reflectors.

FIG. 10 illustrates another example of array of micro-reflectors 90. This example shown in FIG. 10 is suitable for cases where a primary light source utilizing a point-like light emitting element such as LED is employed.

As shown in FIG. 10, an incidence end face is provided by a dent 52a formed at a center portion of a side end face 52 of a light guide plate 50. A primary light source L2 is a non-rod-type one which utilizes a LED (Light Emitting Diode) and have a small emitting area, being disposed to supply light to the light guide plate through the dent 52a.

A great number of micro-reflectors 90 are arrayed on a back face 54. The micro-reflectors are arrayed and orientated according to the following features.

1. Covering rate tends to increase with an increasing distance from the dent 52a. This prevents brightness from varying on the emission face depending on distance from the dent 52a (or the light source L2).

2. Micro-reflectors 90 are orientated radially with respect to the dent 52a over the back face 54. Guiding portions are directed to the dent 52a. In other words, ridge portions 95 of conversion output portions of micro-reflectors 90 (FIGS. 6 and 7) extend in directions directed to the dent 52a.

However, as forementioned, it is noted that all or a part of the micro-reflectors may have orientations, expressed by parameter θr in FIG. 7, which are rotated clockwise or anticlockwise by a small angle ranging from several degrees to 20 degrees, for example 18 degrees, with respect to the illustrated individual orientations.

3. If the light source L2 has a strong emitting directivity to a frontal direction, covering rate of micro-reflectors 90 may be increased around side end faces 52. In particular, corner areas E and F is preferably provided with a heightened covering rate of micro-reflectors 90.

4. The micro-reflectors 90 is arrayed as to avoid having a striking order such that many micro-reflectors just align on a straight line. This renders the micro-reflectors 90 more inconspicuous. And this prevents also Moire stripes which could be caused by an overlapping relation with a matrix-like electrode array when the device is incorporated in a LCD.

Figure 11:
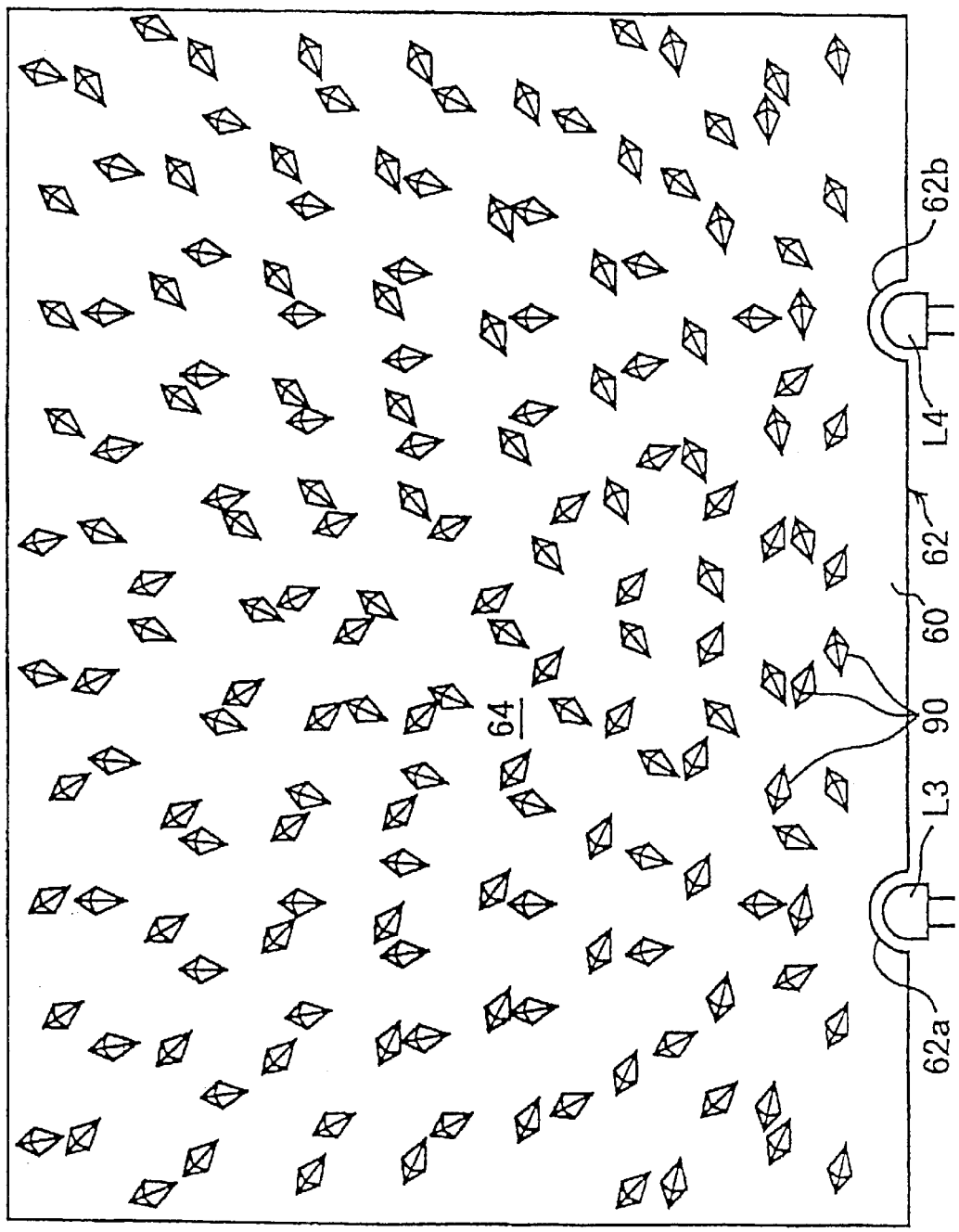
FIG. 11 illustrates still another example of array of micro-reflectors.

FIG. 11 illustrates still another example of array of micro-reflectors 90. This example shown in FIG. 11 is suitable for cases where primary light sources utilizing a point-like light emitting element such as LED are disposed at two positions.

As shown in FIG. 11, incidence end faces are provided by two dents 62a and 62b formed on a side end face 62 of a light guide plate 60. Primary light sources L3 and L4 are non-rod-type ones each of which utilizes LED (Light Emitting Diode) and have a small emitting area, being disposed to supply light to the light guide plate through the dents 62a and 62b, respectively.

A great number of micro-reflectors 90 are arrayed on a back face 64. The micro-reflectors are arrayed and orientated according to the following features.

1. Covering rate and orientation are designed as to avoid a brightness variation from appearing on the emission face, with relations with positions of dents 62a and 63b being considered.

In the first place, a distribution (called Distribution 3) of covering rate and orientation is designed as to achieve a uniform brightness over the emission face under a provision that light is supplied from only one light source L3.

In the second place, another distribution (called Distribution 4) of covering rate and orientation is designed as to achieve a uniform brightness over the emission face under another provision that light is supplied from only the other light source L4.

Distribution 4 is added to Distribution 4 to obtain a piled distribution (called Distribution 3+Distribution 4) of covering rate and orientation, which is employed in this example.

While covering rate according to Distribution 3 tends to increase with an increasing distance from the light source L3, covering rate according to Distribution 4 tends to increase with an increasing distance from the light source L4. Accordingly, as a whole, gradients of Distribution 3 and Distribution 4 tends to be cancelled by each other. In the illustrated example, a roughly uniform covering rate is shown.

A half of the micro-reflectors 90 are orientated radially with respect to the dent 62a according to Distribution 3 and the other half of are orientated radially with respect to the dent 62b according to Distribution 4. However, as forementioned, it is noted that all or a part of the micro-reflectors may have orientations, expressed by parameter θr in FIG. 7, which are rotated clockwise or anticlockwise by a small angle ranging from several degrees to 20 degrees, for example 18 degrees, with respect to the illustrated individual orientations.

2. The micro-reflectors 90 is arrayed as to avoid having a striking order such that many micro-reflectors just align on a straight line. This renders the micro-reflectors 90 more inconspicuous. And this prevents also Moire stripes which could be caused by an overlapping relation with a matrix-like electrode array when the device is incorporated in a LCD.

Figure 12:
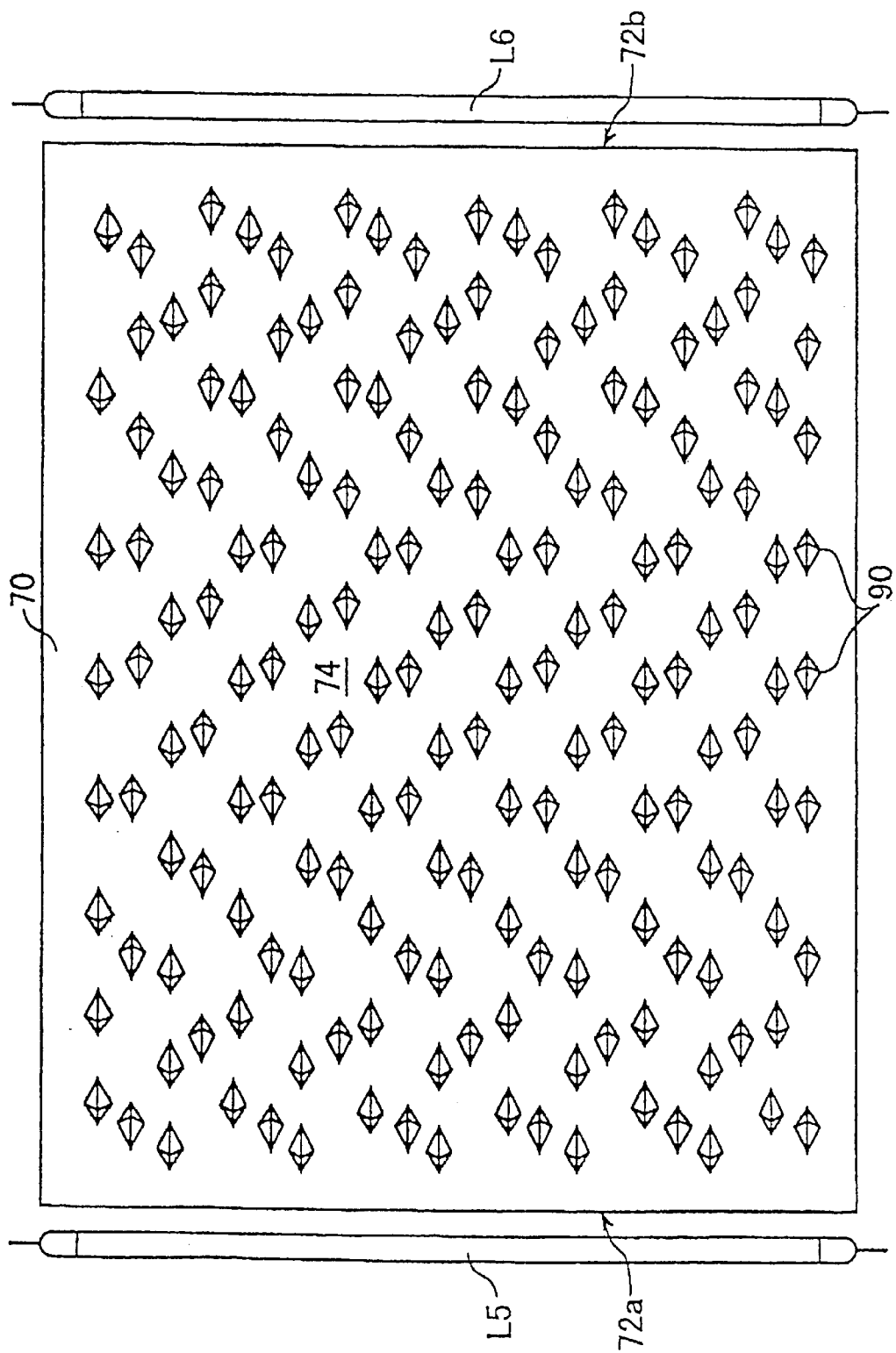
FIG. 12 illustrates still one more example of array of micro-reflectors.

FIG. 12 illustrates still one more example of array of micro-reflectors 90. An application to a so-called two-lamp-arrangement is shown in FIG. 12. An employed light guide plate 70 has incidence end faces 72a and 72b provided by a pair of minor faces parallel with each other.

Rod-like primary light sources (cold cathode lamps) L5 and L6 are disposed along the incidence end faces 72a and 72b to supply light thereto, respectively. A great number of micro-reflectors 90 are arrayed on a back face 74. The micro-reflectors are arrayed and orientated according to the following features.

1. Covering rate and orientation are designed as follows. In the first place, a distribution (called Distribution 5) of covering rate and orientation is designed as to achieve a uniform brightness over the emission face under a provision that light is supplied from only one light source L5.

In the second place, another distribution (called Distribution 6) of covering rate and orientation is designed as to achieve a uniform brightness over the emission face under another provision that light is supplied from only the other light source L6.

Distribution 5 is added to Distribution 6 to obtain a piled distribution (called Distribution 5+Distribution 6) of covering rate and orientation, which is employed in this example.

While covering rate according to Distribution 5 tends to increase with an increasing distance from the emission end face 72a, covering rate according to Distribution 6 tends to increase with an increasing distance from the incidence end face 72b. Accordingly, as a whole, gradients of Distribution 5 and Distribution 6 tends to be cancelled by each other. In the illustrated example, a roughly uniform covering rate is shown.

The micro-reflectors 90 are orientated in a direction generally perpendicular to the incidence end faces 72a and 72b. It is noted that guiding portions of micro-reflectors according to Distribution 5 are directed to the incidence end face 72a and guiding portions of micro-reflectors according to Distribution 6 are directed to the incidence end face 72b.

However, as forementioned, it is also noted that all or a part of the micro-reflectors may have orientations, expressed by parameter θr in FIG. 7, which are rotated clockwise or anticlockwise by a small angle ranging from several degrees to 20 degrees, for example 18 degrees, with respect to the illustrated individual orientations.

Usually, the primary light sources L5 and L6 have an equal power to each other and a half of the micro-reflectors are directed to the incidence end face 72a and the other half are directed to the incidence end face 72b.

2. The micro-reflectors 90 is arrayed as to avoid having a striking order such that many micro-reflectors just align on a straight line. This renders the micro-reflectors 90 more inconspicuous. And this prevents also Moire stripes which could be caused by an overlapping relation with a matrix-like electrode array when the device is incorporated in a LCD.

As described above, according to the present invention, not only an effective direction conversion is achieved within a light guide plate based on a twice-occurring-reflection function of micro-reflectors distributed on a back face of the light guide plate but also direct escaping of light at an emission face is controlled. Therefore, a light guide plate, surface light source device and liquid crystal display free from a fine unevenness in brightness are obtained.

What is claimed is:

1. A light guide plate comprising:

two major faces to provide an emission face and a back face; and an incidence end face for introducing light, wherein said back face is provided with a great number of projection-like micro-reflectors for direction-conversion of light, each of which includes a guiding portion and a conversion output portion that includes a ridge portion and a pair of first and second reflection surfaces formed on both sides of the ridge portion respectively as to be inclined with respect to a general plane representative of said back face, said ridge portion and said first and second reflection surfaces forming a valley in the micro-reflector, said valley getting narrower and shallower as being distant from the guiding portion so that an inner input light reaching the valley via the guiding portion is reflected by one of the first and second reflection surfaces and is further reflected by the other of the first and second reflection surfaces as to produce an inner output light directed to said emission face, said emission face being provided with a great number of projection rows running approximately at right angles with respect to said incidence end face, said projection rows have an inner reflection function which controls a direct escaping of the inner out put from said emission face.

2. A light guide plate in accordance with claim 1, wherein said first reflection surface is inclined with respect to said general plane representative of said back face at an inclination angle different from another inclination angle at which said second reflection surface is inclined with respect to the general plane.

3. A light guide plate in accordance with claim 1, wherein said ridge portion extends in a direction which varies depending on location on said back face according to an extending-direction distribution.

4. A surface light source device comprising:

at least one primary light source; and a light guide plate having two major faces to provide an emission face and a back face, and an incidence end face for introducing light from said primary light source, wherein said back face is provided with a great number of projection-like micro-reflectors for direction-conversion of light, each of which includes a guiding portion and a conversion output portion that includes a ridge portion and a pair of first and second reflection surfaces formed on both sides of the ridge portion respectively as to be inclined with respect to a general plane representative of said back face, said ridge portion and said first and second reflection surfaces forming a valley in the micro-reflector, said valley getting narrower and shallower as being distant from the guiding portion so that an inner input light reaching the valley via the guiding portion is reflected by one of the first and second reflection surfaces and is further reflected by the other of the first and second reflection surfaces as to produce an inner output light directed to said emission face, said emission face being provided with a great number of projection rows running approximately at right angles with respect to said incidence end face, said projection rows have an inner reflection function which controls a direct escaping of the inner out put from said emission face.

5. A surface light source device in accordance with claim 4, wherein a reflection member is disposed along said back face.

6. A surface light source device in accordance with claim 4, wherein said first reflection surface is inclined with respect to said general plane representative of said back face at an inclination angle different from another inclination angle at which said second reflection surface is inclined with respect to the general plane.

7. A surface light source device in accordance with claim 5, wherein said first reflection surface is inclined with respect to said general plane representative of said back face at an inclination angle different from another inclination angle at which said second reflection surface is inclined with respect to the general plane.

8. A surface light source device in accordance with claim 4, 5, 6 or 7, wherein said ridge portion extends in a direction which varies depending on location on said back face as to approximately accord with a light coming direction.

9. A surface light source device in accordance with claim 4, 5, 6 or 7, wherein said ridge portion extends in a direction which varies depending on location on said back face as to be inclined at a small angle with respect to a light coming direction.

10. A liquid crystal display comprising:

a liquid crystal display panel; and a surface light source device for illuminating said liquid crystal display panel, said surface light source device being provided with at least one primary light source and a light guide plate having two major faces to provide an emission face and a back face, and an incidence end face for introducing light from said primary light source, wherein said back face is provided with a great number of projection-like micro-reflectors for direction-conversion of light, each of which includes a guiding portion and a conversion output portion that includes a ridge portion and a pair of first and second reflection surfaces formed on both sides of the ridge portion respectively as to be inclined with respect to a general plane representative of said back face, said ridge portion and said first and second reflection surfaces forming a valley in the micro-reflector, said valley getting narrower and shallower as being distant from the guiding portion so that an inner input light reaching the valley via the guiding portion is reflected by one of the first and second reflection surfaces and is further reflected by the other of the first and second reflection surfaces as to produce an inner output light directed to said emission face, said emission face being provided with a great number of projection rows running approximately at right angles with respect to said incidence end face, said projection rows have an inner reflection function which controls a direct escaping of the inner out put from said emission face.

11. A liquid crystal display in accordance with claim 10, wherein a reflection member is disposed along said back face.

12. A liquid crystal display in accordance with claim 10, wherein said first reflection surface is inclined with respect to said general plane representative of said back face at an inclination angle different from another inclination angle at which said second reflection surface is inclined with respect to the general plane.

13. A liquid crystal display in accordance with claim 11, wherein said first reflection surface is inclined with respect to said general plane representative of said back face at an inclination angle different from another inclination angle at which said second reflection surface is inclined with respect to the general plane.

14. A liquid crystal display in accordance with claim 10, 11, 12 or 13, wherein said ridge portion extends in a direction which varies depending on location on said back face as to approximately accord with a light coming direction.

15. A liquid crystal display in accordance with claim 10, 11, 12 or 13, wherein said ridge portion extends in a direction which varies depending on location on said back face as to be inclined at a small angle with respect to a light coming direction.

* * * * *

UNITED STATES PATENT AND TRADEMARK OFFICE
CERTIFICATE OF CORRECTION

PATENT NO. : 6,485,157 B2
DATED : November 26, 2002
INVENTOR(S) : Shingo Ohkawa

It is certified that error appears in the above-identified patent and that said Letters Patent is hereby corrected as shown below:

Column 12,
Line 39, change "micro-reflectors" to -- micro-reflectors' --.

Column 14,
Line 41, begin a new paragraph with -- However, as --.

Signed and Sealed this

Tenth Day of June, 2003

JAMES E. ROGAN
*Director of the United States Patent and Trademark Office*